(12) United States Patent
Miyasu et al.

(10) Patent No.: US 7,631,992 B2
(45) Date of Patent: Dec. 15, 2009

(54) LIGHT SOURCE APPARATUS

(75) Inventors: Katsuoki Miyasu, Hyogo (JP); Takehiko Iguchi, Hyogo (JP); Hitoshi Nakabayashi, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 103 days.

(21) Appl. No.: 11/851,708

(22) Filed: Sep. 7, 2007

(65) Prior Publication Data

US 2008/0253123 A1 Oct. 16, 2008

(30) Foreign Application Priority Data

Sep. 12, 2006 (JP) ............... 2006-246693

(51) Int. Cl.
*F21V 33/00* (2006.01)

(52) U.S. Cl. ............... 362/373; 362/294; 362/285

(58) Field of Classification Search ......... 362/285–289, 362/373, 362, 267, 261, 264, 294, 508, 512–514, 362/523, 529–535

See application file for complete search history.

(56) References Cited

U.S. PATENT DOCUMENTS

| | | | | |
|---|---|---|---|---|
| 5,136,489 A | * | 8/1992 | Cheng et al. ............. | 362/294 |
| 5,283,718 A | * | 2/1994 | Stephenson et al. ......... | 362/572 |
| 6,623,133 B1 | * | 9/2003 | Keogh ................... | 362/33 |
| 2006/0028826 A1 | * | 2/2006 | Chen et al. .............. | 362/373 |
| 2007/0147051 A1 | * | 6/2007 | Miyasu et al. ............ | 362/362 |

FOREIGN PATENT DOCUMENTS

JP 2004-185999 A 7/2004

\* cited by examiner

*Primary Examiner*—Jacob Y Choi
*Assistant Examiner*—Robert J May
(74) *Attorney, Agent, or Firm*—Rader, Fishman & Grauer, PLLC

(57) ABSTRACT

A light source apparatus comprises a casing having a light emission window which is formed on a front side of the casing; a lamp provided in the casing; a light condensing reflection mirror which is provided in the casing and which has a reflection face therein for reflecting light emitted from the lamp towards the light emission window; a lamp position adjustment mechanism which holds the lamp and adjusts a position of the lamp in the casing; and a spatial separation wall, wherein a light source installation space is defined by the casing and the spatial separation wall structure member, and wherein the lamp position adjustment mechanism is disposed outside the light source installation space.

11 Claims, 9 Drawing Sheets

LIGHT SOURCE APPARATUS

CROSS-REFERENCES TO RELATED APPLICATION

This application claims priority from Japanese Patent Application Serial No. 2006-246693 filed on Sep. 12, 2006, the contents of which are incorporated herein by reference in its entirety.

TECHNICAL FIELD

Described herein is a light source apparatus installed in a projector apparatus, and especially a light source apparatus which is equipped with a high intensity short arc type discharge lamp as a light source, in which xenon gas may be used as light emission medium.

BACKGROUND

In recent years, a projector apparatus for a digital cinema is used in film showing since a high definition image can be offered, and in a projector apparatus for a digital cinema, in order to project a clear image to a large screen, it is necessary to use a high intensity light source. Therefore, a light source apparatus equipped with a short arc type xenon lamp, which emits light of the wavelength near that of sunlight, and whose rated power is about 2-7 kW, is used.

FIG. 8 is a schematic perspective view showing the structure of a conventional light source apparatus. FIG. 9A is an enlarged perspective view of a conventional lamp position adjustment mechanism, and FIG. 9B is an explanatory cross sectional view of a relevant part thereof provided in a conventional light source apparatus. A light source apparatus 60 has a casing 11 which is made up of a casing substrate 111, and a casing cover 112 in which a light emission window 112a is formed in a front side face thereof. In the casing 11, enclosed is a discharge lamp 12 which has an arc tube portion 12a and side tube portions 12b extending from both ends of the arc tube portion 12a, respectively; a back side light condensing reflection mirror 14 which is supported by a reflection mirror support member 13, and which directly reflects visible light emitted from the discharge lamp 12 so as to condense it towards the light emission window 112a; a front side reflection mirror 15 for reflecting back light which is emitted from the discharge lamp 12, but which is not caught by the back side light condensing reflection mirror 14 and is emitted toward the front side, to the back side light condensing reflection mirror 14; and a lamp position adjustment mechanism 16 which holds one of the side tube portions 12b of the discharge lamp 12, and adjusts the position of the discharge lamp 12 in an X axial direction, a Y axial direction, and a Z axial direction.

The discharge lamp 12 comprises the approximately spherical arc tube section 12a and the cylindrical side tube portions 12b which extend from the both ends of the arc tube portion 12a. While a pair of electrodes is arranged so as to face each other inside the arc tube portion 12a, xenon gas is enclosed so that the vapor pressure of the xenon gas at time of lighting may fall within a range of 2 to 8 MPa. Cylindrical mouthpieces 12c for electric supply, each of which is electrically connected to an external lead extending from each end portion of the side tube portions 12b towards the outside, are attached to the respective side tube portions 12b of the discharge lamp 12. One of the mouthpieces 12c has a two-section structure, and is held by a lamp holder 12d which is connected to a lamp connection section 164, and the other side tube portion 12b is not fixed so as to be a free end, whereby the lamp is cantilevered, so that the tube axis of the discharge lamp 12 is held with the posture extending in parallel with the ground (the casing substrate 111). Electric power is supplied to the pair of electrodes arranged in the arc tube portion 12a through the mouthpieces 12c which are attached to the side tube portions 12b of the discharge lamp 12, by a power supply device for lighting (not shown) arranged outside the casing 11, wherein visible light is emitted from electric discharge arc generated by producing dielectric breakdown between the pair of electrodes. The range of such rated lighting electric power of the discharge lamp 12 is 2 to 7 kW.

In the back side light condensing reflection mirror 14, a front opening and a back opening 14a are provided. Also, a spheroidal reflective surface (reflection face) on which light emitted from the discharge lamp 12 is reflected to the light emission window 112a of the casing 11 is formed inside the back side light condensing reflection mirror 14. The spheroidal reflective surface of the back side light condensing reflection mirror 14 are made from a dielectric multilayer which reflects visible light, but transmits ultraviolet radiation and infrared light transmits towards the back side thereof. A front opening and a back opening are provided in the front side reflection mirror 15, and the front side reflection mirror 15 has a spheroidal reflective surface which reflects light emitted from the discharge lamp 12 but which is not be caught by the back side light condensing reflection mirror 14, towards the back side light condensing reflection mirror 14. The back side light condensing reflection mirror 14 and the front side reflection mirror 15 are disposed in a predetermined position in the casing 11 by the reflection mirror support member 13.

As mentioned above, the mouthpiece 12c is attached to the side tube portion 12b of the discharge lamp 12, and the mouthpiece 12c is attached to the lamp holder 12d, after the discharge lamp 12 is inserted in the openings of the front side reflection mirror 15 and the back side light condensing reflection mirror 14 so that the outer circumference of the mouthpiece 12c attached to one of the side tube portions 12b of the discharge lamp 12, may not be in contact with opening end edges of the back side light condensing reflection mirror 14 and the front side reflection mirror 15.

As shown in an FIG. 9A, the lamp position adjustment mechanism 16 includes an X axial direction drive mechanism 161 fixed on the casing substrate 111; a Y axial direction drive mechanism 162 fixed on the X axial direction drive mechanism 161; a Z axial direction drive mechanism 163 built in a drive section 162X of the Y axial direction drive mechanism 162; and the lamp connection section 164 for holding the side tube portion 12b of the discharge lamp 12, which is connected with the Z axial direction drive mechanism 163, through the mouthpiece 12c.

The X axial direction drive mechanism 161 comprises a pair of rails 161x which face each other, and a drive section 161X which slides in the direction of the X axis in a state where the X axial direction drive mechanism 161 is sandwiched at both ends edges thereof by the pair of rails 161x. The position in the direction of X axis of the discharge lamp 12 is adjusted by applying a driving force to the drive section 161X by a predetermined drive means so that the drive section 161X may slide in the direction of X axis.

Similarly, the Y axial direction drive mechanism 162 comprises a pair of rails 162x which face each other, and a drive section 162X which slides in the direction of the Y axis in a state where the Y axial direction drive mechanism 162 is sandwiched at both ends edges thereof by the pair of rails 162x. The position in the direction of Y axis of the discharge lamp 12 is adjusted by applying a driving force to the drive section 162X by a predetermined drive means so that the drive section 162X may slide in the direction of Y axis.

As shown in FIG. 9B, the Z axial direction drive mechanism 163 comprises a drive gear 163a connected to a drive unit (not shown), a rotational axis section 163b which is connected to the drive gear 163a, and has a screw section 163p, on an upper portion of which a screw processing is carried out, and an arm 163c which has a hole 163q having a bottom, in a base end side on which a screw processing is carried out. The screw section 163p of the rotational axis section 163b is screwed in the hole 163q (having a bottom) of the arm 163c in which a screw processing is carried out. The position in the direction of the Z axis of the discharge lamp 12 is adjusted by applying a driving force to the rotational axis section 163b through the drive gear 163a by a predetermined drive means so that the rotational axis section 163b goes up or down while rotating, whereby the arm 163c which is screwed in the rotational axis section 163b goes up or down. Such a drive means may be either a manual operation or automatic action. In the case of the automatic action, the well-known art such as a motor, is used.

An annular lamp connection section 164 which has a through-hole 164a formed therethrough in the direction of the tube axis of the discharge lamp 12 is provided in the tip of the arm 163c of the Z axial direction drive mechanism 163. By inserting a connection member 164b, for example, a bolt and the like, from the one end side of the lamp connection section 164 into the through-hole 164a of the lamp connection section 164, the lamp holder 12d is connected to a face of the other end of the lamp connection section 164. Since the outer circumference of the mouthpiece 12c provided in the side tube portion 12b of the discharge lamp 12 is covered with the lamp holder 12d, the discharge lamp 12 is fixed to the lamp connection section 164.

In such a discharge lamp 12, while the discharge lamp 12 installed in the casing 11 is turned on, the radiant intensity of the light emitted to the outside of the casing 11 from the light emission window 112a formed in the casing 11 is measured, the position of the discharge lamp 12 is finely adjusted by the X axis drive mechanism 161, the Y axis drive mechanism 162, and the Z axis drive mechanism 163 so that the radiant intensity of the light may become the optimal.

SUMMARY

In a projector apparatus for a recent digital cinema, as projection of a high definition image on a large screen is required more strongly than ever before, improvement in the radiant intensity of light from a light source apparatus is demanded. Such a demand is fulfilled by supplying high electric power to a discharge lamp so as to raise the radiation intensity of light from the discharge lamp. Specifically, the discharge lamp whose rated power is 3 to 7 kW is installed in a light source apparatus for a projector apparatus.

However, while, as mentioned above, the radiant intensity of the light emitted from a discharge lamp is getting higher every year, since a reflective film which has the property of reflecting only visible light towards the light emission window 112a of the casing 11, and transmitting ultraviolet radiation and infrared light to a back side of the back side light condensing reflection mirror 14, is formed on the surface of the back side light condensing reflection mirror 14, high intensity ultraviolet radiation and high intensity infrared light which has transmitted the back side light condensing reflection mirror 14 will be irradiated onto the lamp position adjustment mechanism 16 located in the back side of the back side light condensing reflection mirror 14, thereby having problems set forth below.

Since it is necessary to smoothly slide the drive section 161X (162X) with respect to the pair of rails 161x (162x) in the above-mentioned X axial direction drive mechanism (Y axial direction drive mechanism, Z axial direction drive mechanism), the rails 161x (162x) and the drive section 161X (162X) are made of, for example, TEFLON (registered trademark) resin. If they are exposed to the strong ultraviolet radiation and infrared light which has transmitted the back side light condensing reflection mirror 14, the rails 161x (162x) and the drive section 161X (162X) deteriorate due to the heat caused by absorbing the ultraviolet rays and/or infrared light, thereby causing a wobbly state therebetween, so that the position of the discharge lamp 12 in the X and Y axial directions cannot be adjusted well.

Furthermore, if the discharge lamp 12 is damaged so that the back side light condensing reflection mirror 14 is also damaged in response to the impact due to the fragments of the dispersed discharge lamp 12, while the position of the discharge lamp 12 is adjusted when the discharge lamp 12 is turned on, there is a possibility that operator who is adjusting the position of the discharge lamp 12 may get injured, or the rails 161x (162x) or drive section 161X (162X) may be damaged due to the impact of the dispersed fragments of the back side light condensing reflection mirror 14.

Therefore, the structure capable of adjusting the position of a discharge lamp so as to be placed at a predetermined position while lighting, is described, in which components which forms a lamp position adjustment mechanism do not deteriorate by ultraviolet radiation or infrared light, and a light source apparatus and a manufacturing method thereof are described, in which when the position of the discharge lamp is adjusted while lighting, even if the discharge lamp is damaged, an operator may not get injured, and/or components of the lamp position adjustment mechanism may not be damaged.

The present light source apparatus comprises a casing having a light emission window which is formed on a front side of the casing; a lamp provided in the casing; a light condensing reflection mirror which is provided in the casing and which has a reflection face therein for reflecting light emitted from the lamp towards the light emission window; a lamp position adjustment mechanism which holds the lamp and adjusts a position of the lamp in the casing; and a spatial separation wall, wherein a light source installation space is defined by the casing and the spatial separation wall structure member, and wherein the lamp position adjustment mechanism is disposed outside the light source installation space.

The spatial separation wall structure member may be a separate component from the casing.

The spatial separation wall structure member may be a box shape.

The spatial separation wall may be part of the casing.

In the light source apparatus, a fresh air passage mouth may be formed in the spatial separation wall structure member.

The fresh air passage mouth may be formed in a side of the spatial separation wall structure member which does not face the light source installation space.

The lamp position adjustment mechanism may be connected through an arm to the lamp through a hole formed in the spatial separation wall.

In the light source apparatus, the width of the hole may be larger than the width of the arm.

The light source apparatus may further include a light shielding plate having an arm insertion mouth, wherein the light shielding plate is slidably attached to the spatial separation wall.

In the light source apparatus, the width of the arm insertion mouth may be approximately the same as that of the light shielding plate so as to block light emitted from the lamp.

In the light source apparatus, at least one opening of the spatial separation wall structure member is formed on a same plane as that of one side of the casing.

In the light source apparatus, the lamp position adjustment mechanism is disposed outside the light source section installation space partitioned by the casing and the spatial separation wall so that the lamp is accommodated therein. Therefore, since ultraviolet radiation and infrared light which transmits the light condensing reflection mirror and which is irradiated on the back side of the light condensing reflection mirror is shielded by the spatial separation wall, the lamp position adjustment mechanism will not be in a high temperature state. Furthermore, even if the light condensing reflection mirror is damaged due to explosion of the discharge lamp occurring while the discharge lamp is adjusted in a state of lighting, and the fragments of the light condensing reflection mirror disperse towards the lamp position adjustment mechanism, since such fragments are blocked by the spatial separation wall, the operator will not get injured, and the structural components of the lamp position adjustment mechanism will not be damaged. Therefore, in the light source apparatus, while it is possible to adjust the position of the discharge lamp so as to be arranged at a predetermined position while the discharge lamp is lighted, even in case where a discharge lamp is damaged while the discharge lamp is adjusted, the operator will not get injured and the structural components of the lamp position adjustment mechanism are not damaged.

Furthermore, in the light source apparatus, since the spatial separation wall structure member is a separate component from the casing, it is possible to easily form the spatial separation wall.

Furthermore, in the light source apparatus, since a fresh air passage for introducing and discharging cooling air which cools down the lamp position adjustment mechanism is provided to the spatial separation wall structure member, even though the spatial separation wall is exposed to ultraviolet radiation and infrared light which is irradiated towards the back side of the light condensing reflection mirror, it is possible to prevent the spatial separation wall from being in a high temperature state, and it is also possible to prevent the lamp position adjustment mechanism located inside the spatial separation wall from being in a high temperature state.

In the manufacture method of the light source apparatus, it is possible to easily manufacture a light source apparatus having the structure in which the lamp position adjustment mechanism is disposed outside the light source section installation space partitioned by the casing and the spatial separation wall.

BRIEF DESCRIPTION OF DRAWINGS

Other features and advantages of the present light source apparatus will be apparent from the ensuing description, taken in conjunction with the accompanying drawings, in which.

DETAILED DESCRIPTION

A description will now be given, referring to embodiments of the present light source apparatus. While the claims are not limited to such embodiments, an appreciation of various aspects of the apparatus is best gained through a discussion of various examples thereof.

Figure 1:
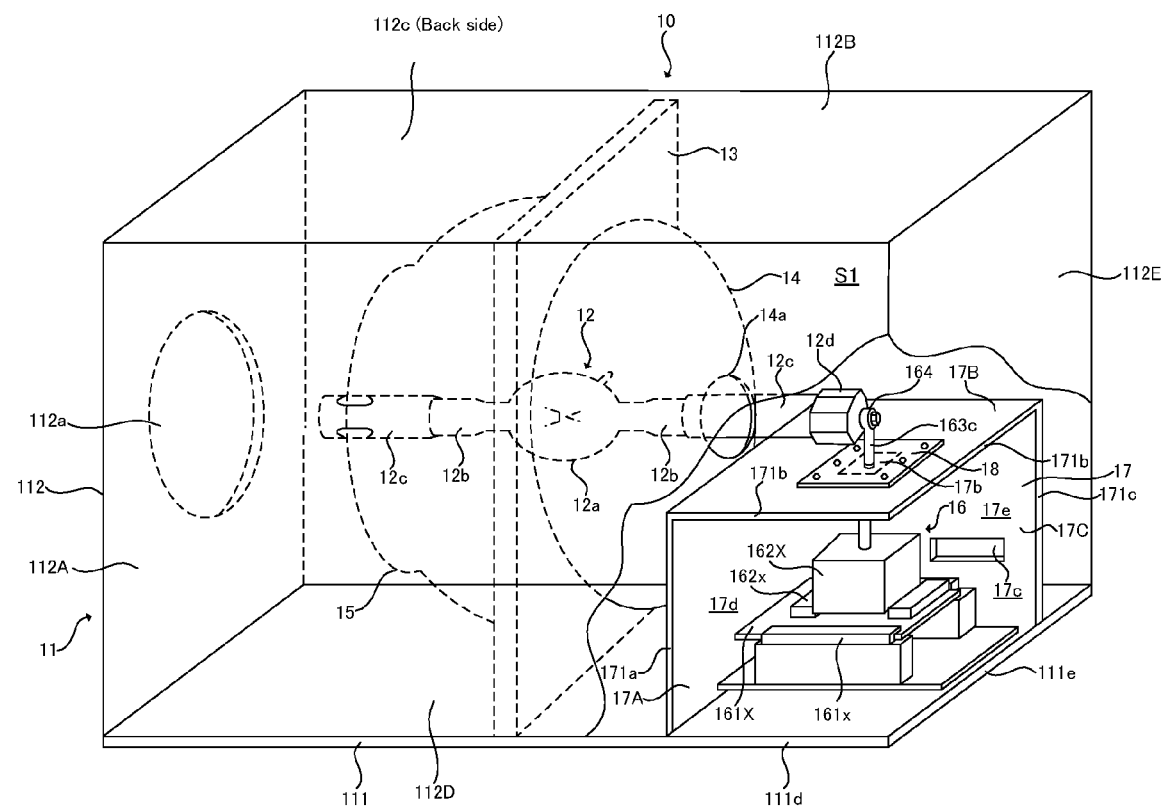
FIG. 1 is an explanatory perspective view showing a schematic structure of an example of a light source apparatus according to an embodiment.
Figure 2:
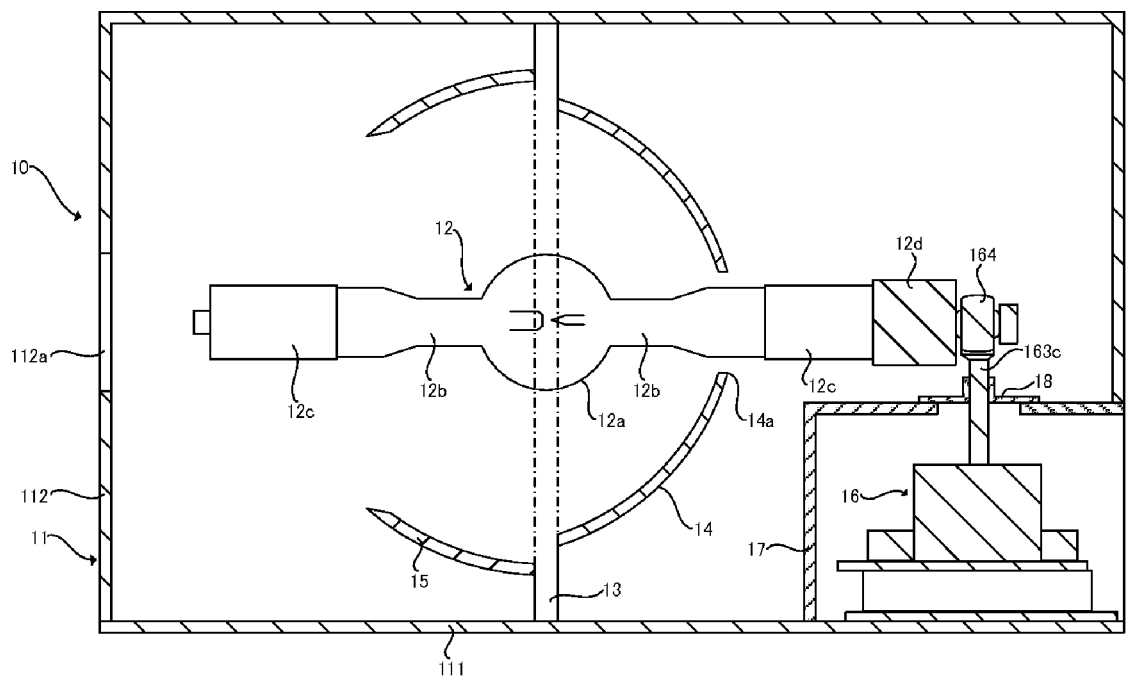
FIG. 2 is an explanatory cross sectional view showing a schematic structure of an example of a light source apparatus according to an embodiment.
Figure 3:
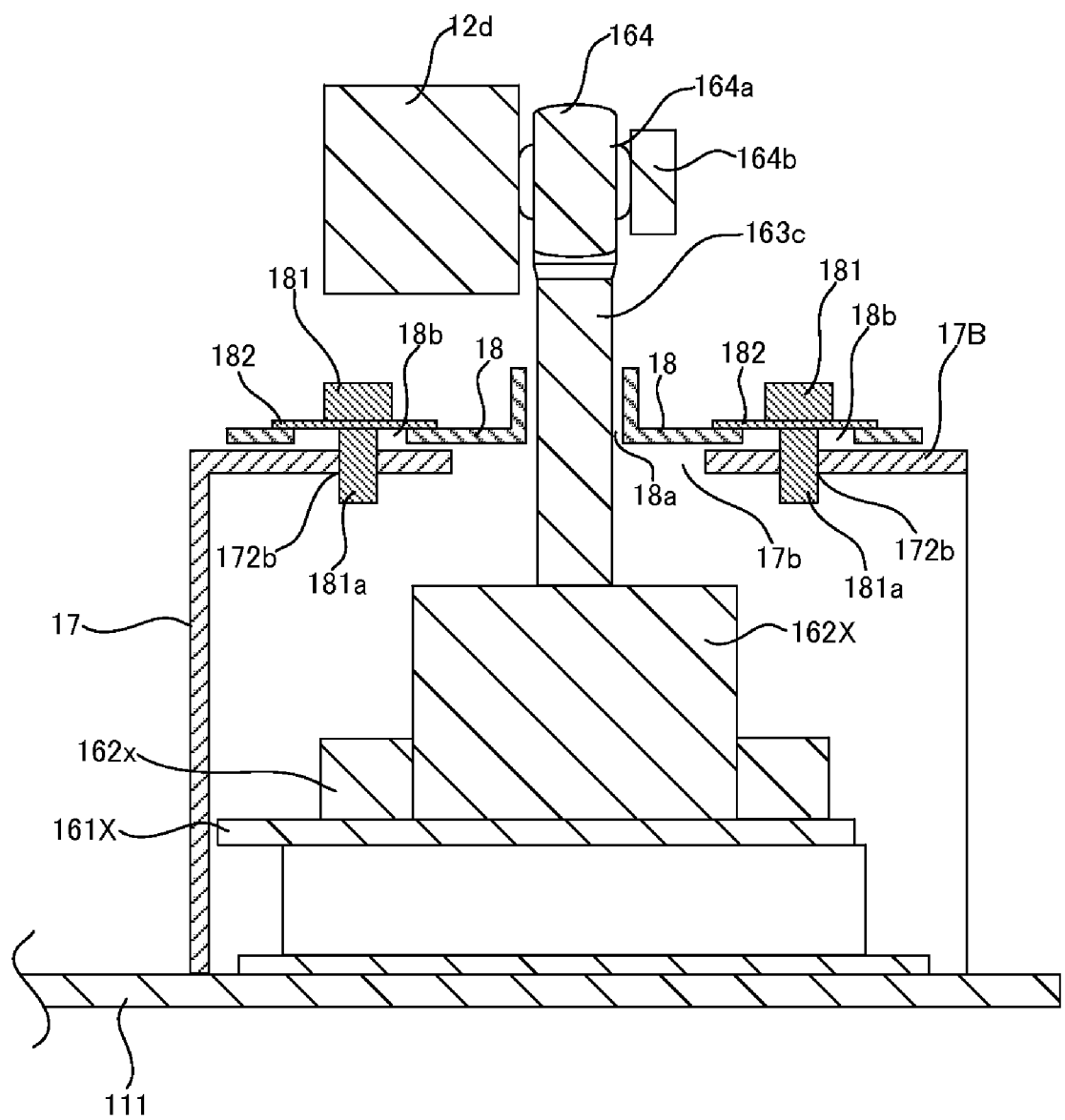
FIG. 3 is an enlarged sectional view of a portion near a light shielding plate arranged on a spatial separation wall structure member.
Figures 4A, 4B:
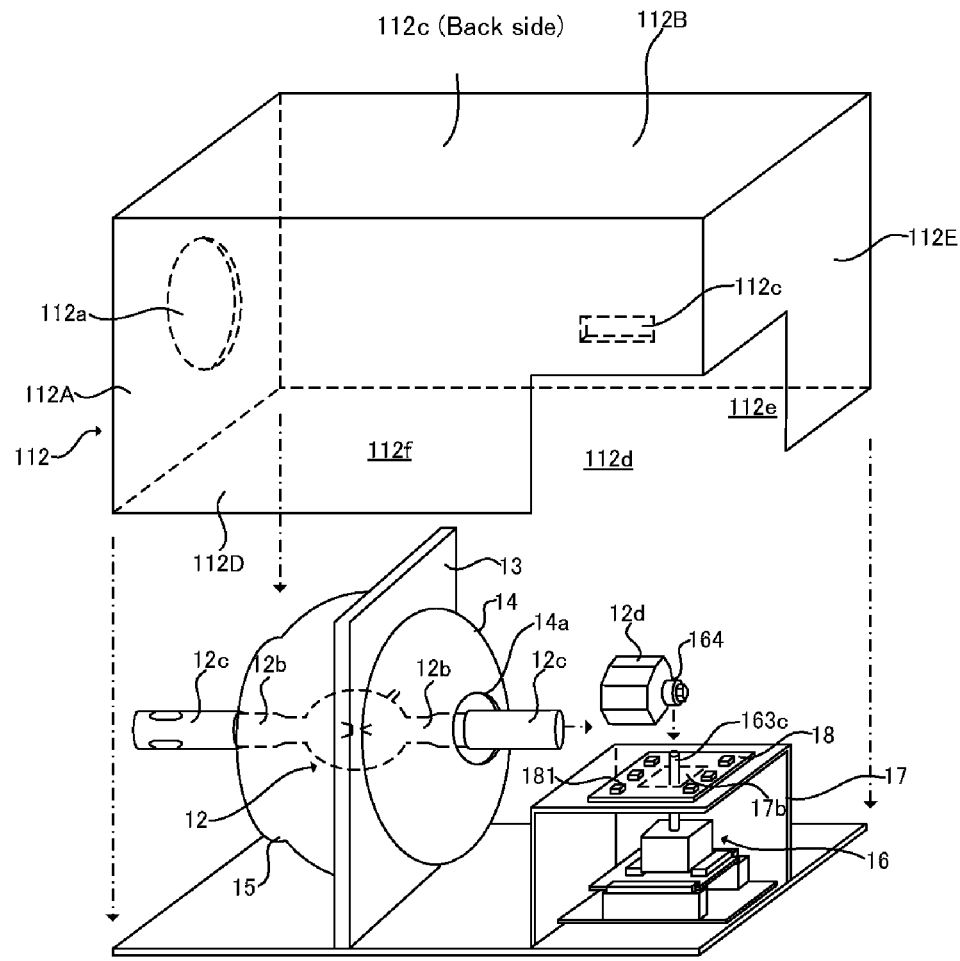
FIGS. 4A and 4B are explanatory perspective views showing a manufacture method of a light source apparatus according to an embodiment.

FIG. 1 is a schematic view of an example of a light source apparatus according to an embodiment. FIG. 2 is a schematic cross sectional view of an example of the light source apparatus according to the embodiment. FIG. 3 is an enlarged cross-sectional view of a spatial separation wall structure member and part near a light shielding plate arranged on the spatial separation wall structure member. FIGS. 4A and 4B are explanatory perspective views showing a manufacture method of a light source apparatus according to the present invention. In FIGS. 1-4A and 4B, the same numerals are given to the same components.

A light source apparatus 10 is equipped with a casing 11 in which a light emission window 112a is formed in a front side face thereof. A discharge lamp 12, a reflection mirror support member 13, a back side light condensing reflection mirror 14, a front side reflection mirror 15, a lamp position adjustment mechanism 16, and a spatial separation wall structure member 17 which covers the circumference of the lamp position adjustment mechanism 16 are disposed inside the casing 11.

The spatial separation wall structure member 17 is a separate component from the casing 11 in this embodiment. As shown in FIGS. 1, 4A and 4B, the spatial separation wall structure member 17 comprises the spatial separation wall 17A located in the left hand side of the spatial wall structure member 17 in the figures, which does not have an opening; the spatial separation wall 17B located in the upper side of the spatial wall structure member 17 in the figures, in which an arm insertion mouth 17b (in which an arm 163c of the lamp position adjustment mechanism 16 is inserted), is formed; a spatial separation wall 17C located in the back side of the spatial wall structure member 17 in the figures in which a fresh air inlet 17c to which a blow-off mouth of a cooling air guidance duct is connected, is provided. The spatial wall structure member 17 has openings 17d, 17e, and 17f formed in the near side, the right hand side and the lower side of the spatial wall structure member 17 in the figures, respectively.

From a viewpoint of heat insulation, it is desirable that the spatial separation wall structure member 17 be formed of, for example, material such as heat insulation system resin.

The casing 11 comprises a casing substrate 111 which is a box shape in a cross section, and a casing cover 112 attached on the casing substrate 111. As shown in FIG. 4A, the casing cover 112 comprises a wall section 112A located in the left hand side of the casing cover 112 in the figure, in which the light emission window 112a is formed; a section 112B located in the upper side thereof in the figure, which does not have any opening; a wall section 112C located in the back side thereof in the figure, (in which a duct insertion slot 112c in which a cooling air guidance duct is inserted), is provided; wall sections 112D and 112E located in the near side and right hand side thereof the figure, respectively, in which die-cut sections 112d and 112e corresponding to the openings 17d and 17e of the spatial separation wall structure member 17 respectively, are formed. Also, an opening 112f is formed in the bottom of the casing cover 112 in figure.

In the light source apparatus 10 of the embodiment, while the side end portions 171a and 171b of the spatial separation walls 17A and 17B in the side of the opening 17d of the spatial separation wall structure member 17 are arranged on the same plane as a side end portion 111d of the casing substrate 111, the spatial separation wall structure member 17 is provided on the casing substrate 111 so that the side end portions 171b and 171c of the spatial separation walls 17B and 17C in the side of the opening 17e of the spatial separation wall structure member 17 are arranged on the same plane as the side end portion 111e of the casing substrate 111. Thereby, the lamp position adjustment mechanism 16 is arranged so as to be isolated out of the light source section installation space S1, in which the discharge lamp 12, the reflection mirror support member 13, the back side light condensing reflection mirror 14, and the front side reflection mirror 15 are included, by partition of the casing cover 112 and the spatial separation walls 17A, 17B, and 17C. Furthermore, in the light source apparatus 10 of the embodiment, the openings 17d and 17e formed in the spatial separation wall structure member 17 are formed so as to be in agreement with die cuts sections 112d and 112e formed in the casing cover 112. While the lamp position adjustment mechanism 16 is partitioned from the light source section installation space S1, the lamp position adjustment mechanism 16 is exposed to the outside. At time of lighting of the discharge lamp 12, a cooling air is introduced in the spatial separation wall structure member 17 from the fresh air inlet 17c provided on the spatial separation wall 17C, by the cooling air guidance duct (not shown), so that the lamp position adjustment mechanism 16 can be cooled down.

As shown in FIG. 3, the width of the arm insertion mouth 17b provided in the spatial separation wall 17B of the spatial separation wall structure member 17 is designed to be much larger than the width of the arm 163c, so that the arm 163c can be moved in the X and Y axial directions in case that position adjustment of the discharge lamp 12 is carried out by the arm 163c of the lamp position adjustment mechanism 16. An arm insertion mouth 18a which has only a minimum width necessary for the arm 163c to be inserted is provided in the light shielding plate 18. The light shielding plate 18 is arranged on the spatial separation wall 17B so as to cover the arm insertion mouth 17b, so that light emitted from the discharge lamp 12 is completely blocked by the light shielding plate 18, whereby the light from the discharge lamp 12 is prevented from being irradiated inside the spatial separation wall 17B.

Furthermore, as set forth below in detail, the light shielding plate 18 is attached on the spatial separation wall 17B so as not to block the movement of the arm 163c in the X and Y axial directions, when the position of the discharge lamp 12 in the X and Y axial directions is adjusted.

As shown in FIG. 3, while each of the fixing members 181 is inserted in a washer 182 arranged so as to cover an opening 18b for fixation which is formed in the light shielding plate 18, by screwing a tip section 181a of the fixing member 181 in a screw hole 172b provided in the spatial separation wall 17B, the light shielding plate 18 is attached to the spatial separation wall 17B. And since the width of the openings 18b of the light shielding plate 18 is formed so as to be large enough as compared with the width of the tip sections 181a of the fixing members 181, when the position of the discharge lamp 12 is adjusted in the X and Y axial directions, even if the arm 163c hits the opening end edge of the arm insertion mouth 18a, it is possible to move the arm 163c in the X and Y axial directions together with the light shielding plate 18. For this reason, when the position of the discharge lamp 12 is adjusted in the X and Y axial directions, the light shielding plate 18 does not block the movement of the arm 163c in the X and Y axial directions.

Such a light source apparatus 10 according to the embodiment is manufactured by a manufacture method shown in FIGS. 4A and 4B. In a first step of the manufacturing process, as shown in FIG. 4B, while the back side light condensing reflection mirror 14 and the front side reflection mirror 15 are attached to the reflection mirror support member 13 which is beforehand installed near the center of the casing substrate 111, the lamp position adjustment mechanism 16 is installed in the side of the side end positions 111d and 111e of the casing substrate 111. The spatial separation wall structure member 17 is put over the lamp position adjustment mechanism 16 installed on the casing substrate 111 so as to cover the mechanism 16, and the spatial separation wall structure member 17 is disposed on the casing substrate 111 so that the arm 163c of the lamp position adjustment mechanism 16 may project outside the spatial separation wall structure member 17 from the opening 17b of the spatial separation wall 17B. Thus, the spatial separation walls which partition the above-mentioned light source section installation space S1 can be easily formed by arranging the spatial separation wall structure member 17 which is a separate component from the casing substrate 111 and/or the casing cover 112. Then, as shown in FIG. 3, the light shielding plate 18 is attached on the spatial separation wall 17B of the spatial separation wall structure member 17 installed on the casing substrate 111 by the fixing members 181.

As shown in FIG. 4A, in a second step of the manufacturing process, after an annular lamp connection section 164 connected with a lamp holder 12d is attached at the tip of the arm 163c of the lamp position adjustment mechanism 16 which is projected from the spatial separation wall 17B, the side tube portion 12b of the discharge lamp 12 to which a mouthpiece 12c is attached, is inserted in the openings of the back side light condensing reflection mirror 14 and the front side reflection mirror 15 which are disposed on the casing substrate 111 through the reflection mirror support member 13. Then, the mouthpiece 12c attached to the side tube portion 12b is held by the lamp holder 12d, so that tube axis of the discharge lamp 12 may extends in parallel with the casing substrate 111, thereby installation of the discharge lamp 12 is completed. In addition, the optical axis of the back side light condensing reflection mirror 14 and the tube axis of the discharge lamp 12 are approximately in agreement with each other.

As shown in FIG. 4B, in a third step of the manufacturing process, the casing cover 112 is installed onto the casing substrate 111 so that the openings 17d and 17e of the spatial separation wall structure member 17 and the die cuts sections 112d and 112e of the casing cover 112 are in agreement with each other, that is, the casing cover 112 is put over from the upper part of the discharge lamp 12, the reflection mirror support member 13, the back side light condensing reflection mirror 14, the front side reflection mirror 15, the lamp position adjustment mechanism 16, and the spatial separation wall structure member 17, in which the fresh air inlet 17c of the spatial separation wall 17C and the duct insertion slot 112c of the casing cover 112 may get close to each other. Thereby, the light source section installation space S1 which is partitioned by the spatial separation walls 17A, 17B, and 17C and the casing cover 112, is formed. The light source section installation space S1, the discharge lamp 12, the reflection mirror support member 13, the back side light condensing reflection mirror 14, and the front side reflection mirror 15 are included. Thus, the light source apparatus 10 having the structure in which the lamp position adjustment mechanism 16 is isolated out of the light source section installation space S1, is completed. The light source apparatus 10 of the embodiment can be easily manufactured by carrying out the first through the third steps of the manufacturing process.

Figure 8:
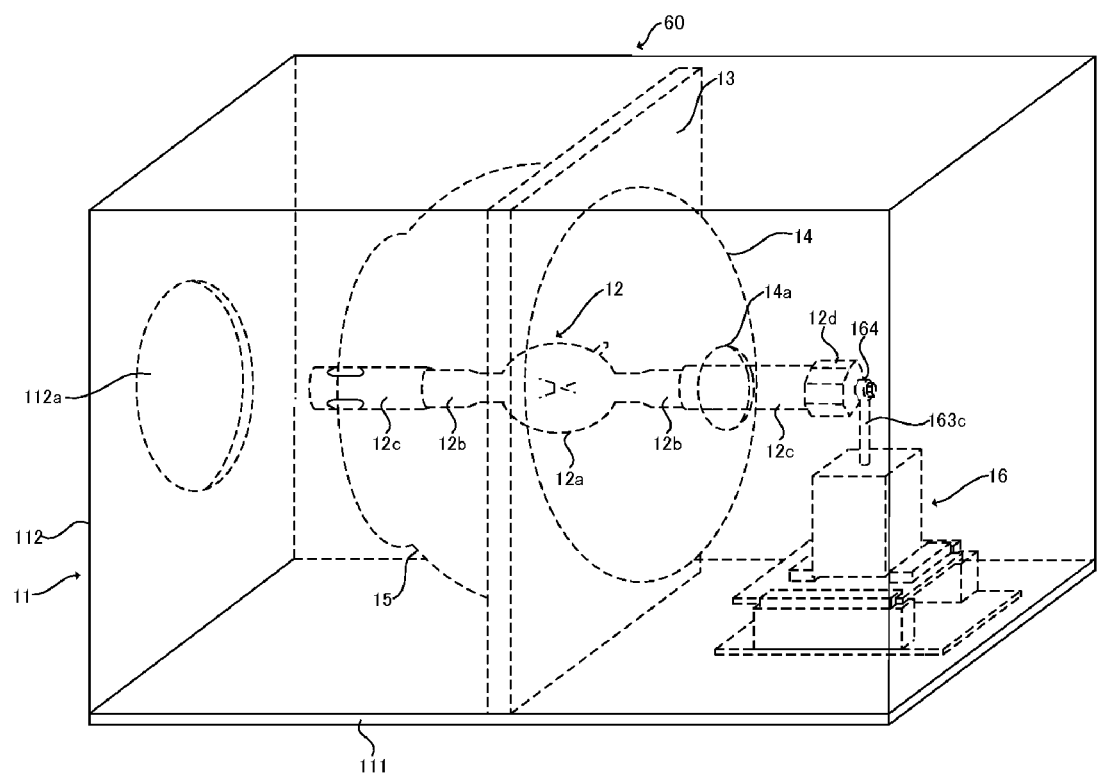
FIG. 8 is the explanatory perspective view showing the schematic structure of a conventional light source apparatus.
Figure 9A:
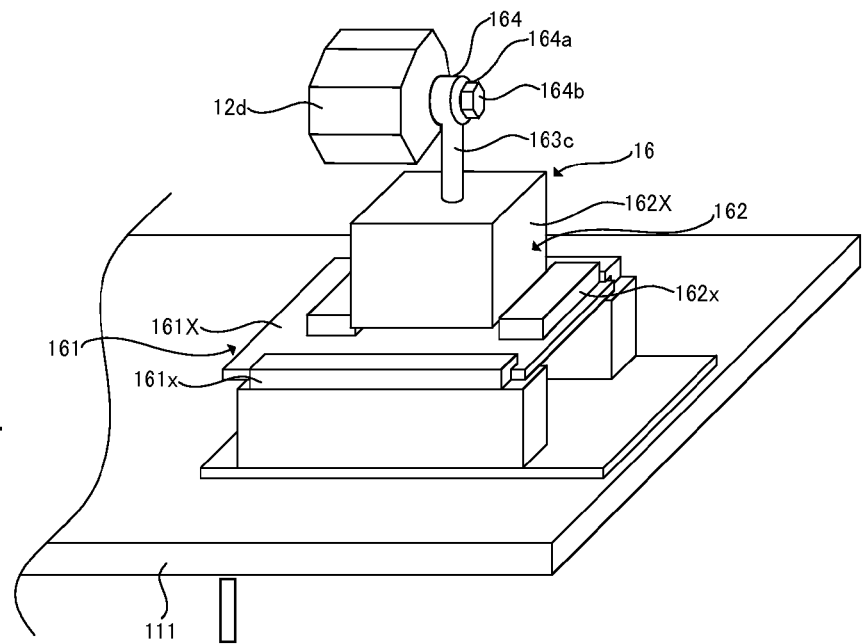
FIG. 9A is a partially enlarged perspective view of a lamp position adjustment mechanism of a conventional light source apparatus.
Figure 9B:
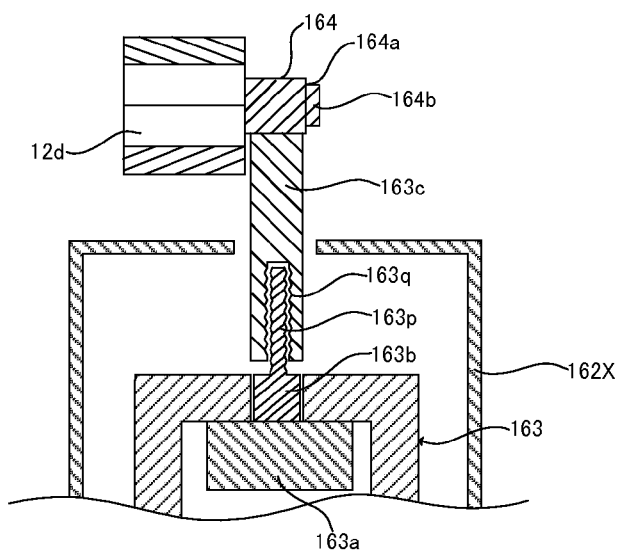
FIG. 9B is a cross sectional view thereof.

According to the light source apparatus 10 of the embodiment, as described above, the lamp position adjustment mechanism 16 is arranged outside the light source section installation space S1, which is partitioned by the casing substrate 111, the wall sections 112A, 112B, 112C, 112D, and 112E of the casing cover 112, and the spatial separation walls 17A, 17B, and 17C of the spatial separation wall structure member 17, wherein in the light source section installation space S1, the discharge lamp 12, the reflection mirror support member 13, the back side light condensing reflection mirror 14, and the front side reflection mirror 15 are included. Since ultraviolet radiation and infrared light which transmits towards the back side of the back side light condensing reflection mirror 14, or the light which transmits towards the back side light condensing reflection mirror 14, and is reflected on the inner face of the casing cover 112, is blocked by the spatial separation walls 17A, 17B, and 17C, the lamp position adjustment mechanism 16 will not be in a high temperature state. And at time of lighting of the discharge lamp 12, since while blowing a cooling air introduced in the spatial separation wall structure member 17 at the lamp position adjustment mechanism 16, the introduced cooling air is discharged through the openings 17d and 17e of the spatial separation wall structure member 17, the cooling air dose not stay inside the spatial separation wall structure member 17, so that the lamp position adjustment mechanism 16 is prevented from being in a high temperature state. Therefore, even if the rails 161x (162x) and the drive section 161X (162X) which form the lamp position adjustment mechanism is made of resin having low thermal resistance etc., they are not exposed to the ultraviolet radiation and infrared light which transmits towards the back side light condensing reflection mirror 14, and thus will not be in a high temperature state so that they do not deteriorate. Therefore, it is possible to solve the problem in the conventional light source apparatus shown in the FIG. 8, in that a wobbly state of the rail 161x and the drive section 161X occurs since they do not fit each other.

Furthermore, according to the above-mentioned light source apparatus, when the position of the discharge lamp 12 in a lighting state is adjusted, even if the back side light condensing reflection mirror 14 and the front side reflection mirror 15 are damaged due to explosion of the discharge lamp 12, so that these fragments disperse towards the lamp position adjustment mechanism 16, since such fragments are blocked by the spatial separation walls 17A, 17B, and 17C of the spatial separation wall structure member 17, an operator does not get injured, and moreover, the structural components (for example, 161x, 162x, 161X, 162X) of the lamp position adjustment mechanism 16 will not be damaged.

In addition, in the above-mentioned light source apparatus, although the light source section installation space S1 is defined by the three spatial separation walls 17A, 17B, and 17C which are provided on three directional faces of the lamp position adjustment mechanism 16 and the casing cover 112, the present invention is not limited to the structure.

Figure 5:
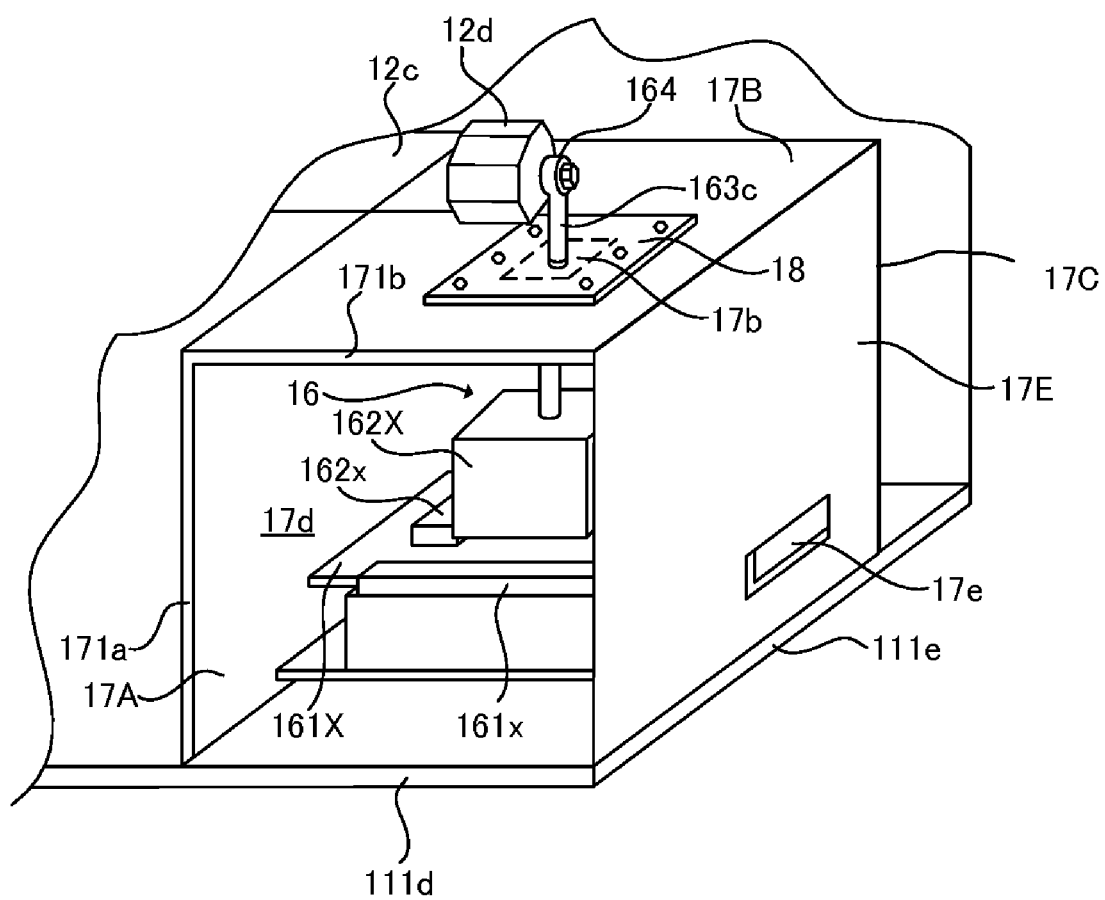
FIG. 5 is an explanatory perspective view showing another embodiment of the light source apparatus according to an embodiment, in which another example of a spatial separation wall structure member is shown.

For example, as shown in FIG. 5, four spatial separation walls 17A, 17B, 17C, and 17E may be provided in four directional faces of the lamp position adjustment mechanism 16, and a fresh air inlet 17e to which a blow-off mouth of a cooling air guidance duct is connected can also be provided in the spatial separation wall 17E which does not face the light source section installation space S1. Since the fresh air inlet is not provided in the spatial separation wall 17C which faces the light source section installation space S1 in the light source apparatus shown in FIG. 5, it is possible to completely block ultraviolet radiation and infrared light which transmits towards the back side light condensing reflection mirror 14, or the light which transmits towards the back side light condensing reflection mirror 14 and is reflected by the inner face of the casing cover 112.

Thus, in the light source apparatus according to the embodiment, since the partitioned light source section installation space S1 is defined by combining the casing cover 112 and the spatial separation wall structure member 17, it is desirable that the spatial separation wall structure member 17 have three or more spatial separation walls so as to surround at least three directional faces of the lamp position adjustment mechanism 16.

In the light source apparatus and manufacture method of the light source apparatus according to the present invention, the structure and the method is not limited to the above-mentioned embodiments, that is, the structure and the manufacture method which are described in detail below can be adopted.

Figure 6:
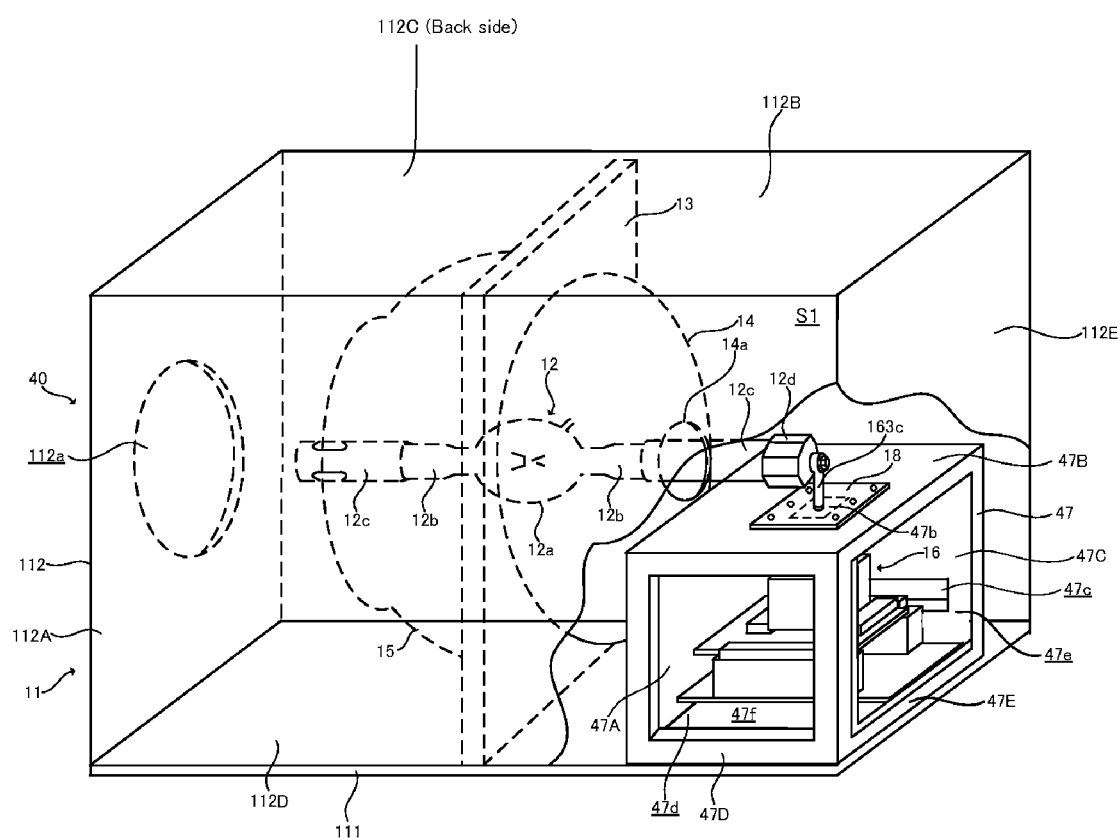
FIG. 6 is an explanatory perspective view showing another embodiment of a light source apparatus, in which another example of a spatial separation wall structure member is shown.
Figure 7A:
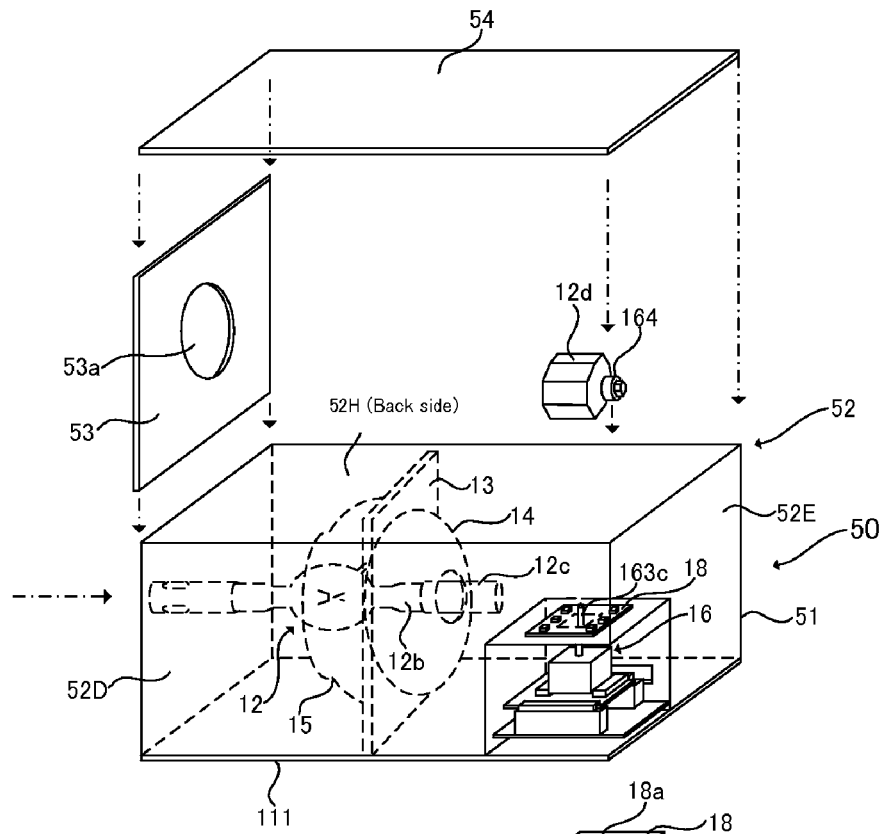
FIGS. 7A and 7B are explanatory perspective views showing another embodiment of a manufacture method of a light source apparatus.
Figure 7B:
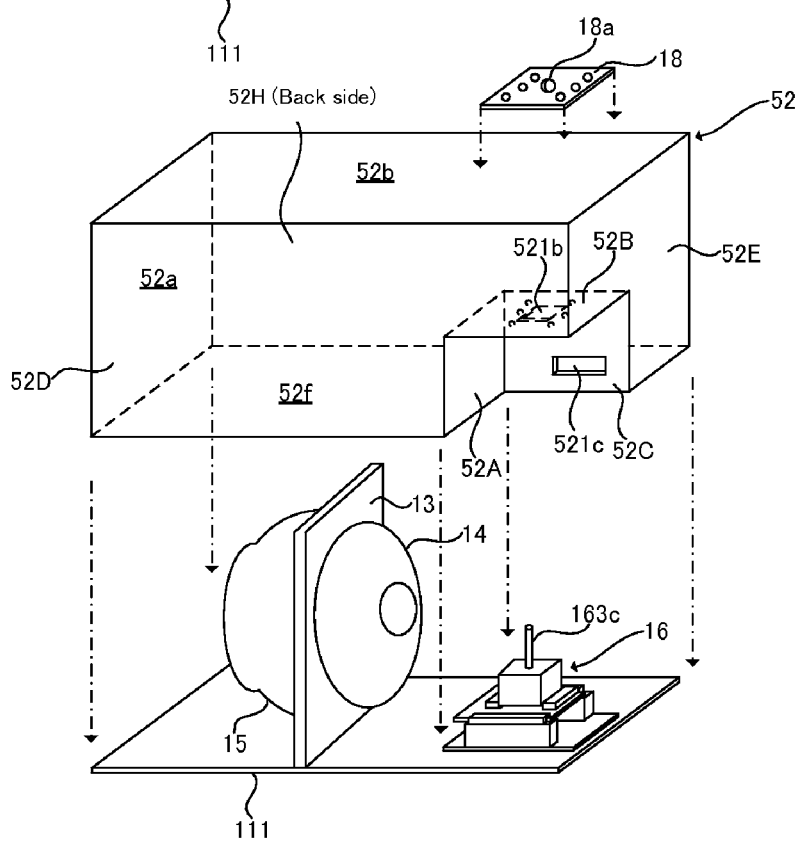

FIG. 6 is an explanatory perspective view showing another embodiment of a light source apparatus, in which especially an example of a spatial separation wall structure member is shown, and FIGS. 7A and 7B are explanatory perspective views showing a manufacture method of another embodiment of the light source apparatus. In FIGS. 6, 7A and 7B, the same numerals as those shown in FIG. 1 are assigned to the same elements as those in FIG. 1, and explanation thereof is omitted.

As shown in FIG. 6, a spatial separation wall structure member 47 is a separate component from the casing 11, and has a box shape as a whole. The spatial separation wall structure member 47 comprises a spatial separation wall 47A located in left hand side of the spatial separation wall structure member 47 in the figure, in which no opening is formed; a spatial separation wall 47B located in the upper part side of the member 47 in the figure and has an arm insertion mouth 47b in which an arm 163c of the lamp position adjustment mechanism 16 is inserted; a spatial separation wall 47C located in the back side of the member 47 in the figure, and has a fresh air inlet 47c to which a blow-off mouth of a cooling air guidance duct is connected; and wall sections 47D and 47E which are located in the right, and near side of the member 47 in the figure and have a fresh air inlets 47d and 47e for discharging a cooling air, respectively. An opening 47f is formed in the spatial separation wall structure member 47 by die cutting in the lower part side thereof in the figure.

In FIG. 6, since the arm insertion mouth 47b is formed in the spatial separation wall and the light shielding plate 18 is attached to the wall section 47B as in the light source apparatuses which are shown in FIGS. 1 and 3, even when the position of the discharge lamp 12 is adjusted in X and Y axial directions, the light shielding plate 18 does not block the arm 163c of the lamp position adjustment mechanism 16 in the X and Y axial directions.

In the light source apparatus 40 shown in FIG. 6, the lamp position adjustment mechanism 16 is arranged outside the light source section installation space S1 partitioned by the casing substrate 111, the casing cover 112, and the spatial separation walls 47A, 47B, and 47C, by installing the spatial separation wall structure member 47 to the casing substrate 111 so that the lamp position adjustment mechanism 16 may be covered from the upper part of the lamp position adjustment mechanism 16.

In addition, in the light source apparatus 40 shown in FIG. 6, the cooling air introduced in the spatial separation wall structure member 47 is discharged through the fresh air inlet 47c from openings provided in the casing cover 112, corresponding to the fresh air inlets 47d and 47e provided in the wall sections 47D and 47E of the spatial separation wall structure member 47.

In the light source apparatus 40 according to the embodiment, substantially the same effect as that obtained from the light source apparatus 10 shown in FIG. 1, is expected. In addition, the light source apparatus 40 is superior to that shown in FIG. 1, in that the casing can be simplified.

Furthermore, in the light source apparatus of the embodiment, it is not an indispensable condition that the spatial separation wall structure member be a separate component from the casing. As described below, referring to FIGS. 7A and 7B, a spatial separation wall can also be formed by a casing, without using the spatial separation wall structure member which is a separate component from the casing. In the light source apparatus 50 shown in FIG. 7, a casing 51 comprises a casing cover main member 52, a casing substrate 111, and a casing cover. The casing cover comprises a light emission window structure frame body 53 in which a light emission window 53a for passing light emitted from the discharge lamp 12 is formed, and a casing cover lid structure member 54 having a plate like shape, which closes an opening 52b provided at the upper side of the casing cover structure main member 52.

In the figure, the casing cover structure main member 52 has wall sections 52H, 52D, and 52E at the back side, the near side and the right side, respectively. Openings 52a, 52b, and 52f are formed by die cutting in three directional faces of the left hand side, the upper side, and the bottom of the casing cover structure main member 52, respectively. Furthermore, the casing cover structure main member 52 comprises a spatial separation wall 52A formed by folded part of the wall sections 52D and 52E into the inner direction of the casing cover structure main member 52, so that the wall sections 52B, 52C, and 52D, extend therefrom, and so as to extend to the inner direction of the casing cover structure main member 52 in parallel to the wall section 52E; a spatial separation wall 52B from which the wall sections 52A, 52C, 52D, and 52E extend, and which is in parallel with the casing substrate 111 and which extends towards the inner direction of the casing cover structure main member 52; and a spatial separation wall 52C from which the wall sections 52A, 52B, and 52E extend and which extends towards the inner direction of the casing cover structure main member 52 and in parallel to the wall sections 52H and 52D, in which an arm 163c of the lamp position adjustment mechanism 16 is inserted in an arm insertion mouth 521b of the spatial separation wall 52B, and a blow-off mouth of a cooling air guidance duct is connected to a duct insertion slot 521c, formed in the spatial separation wall 52C.

The light source apparatus shown in FIGS. 7A and 7B is manufactured as set forth below. In a first step of the manufacturing process, as shown in FIG. 7B, while the back side light condensing reflection mirror 14 and the front side reflection mirror 15 are beforehand attached through the reflection mirror support member 13, to the casing substrate 111, in which the lamp position adjustment mechanism 16 is installed, the casing cover structure main member 52 is attached so that the reflection mirror support member 13, the back side light condensing reflection mirror 14, the front side reflection mirror 15, and the lamp position adjustment mechanism 16 may be covered, wherein the arm 163c of the lamp position adjustment mechanism 16 projects in the inner direction of the casing cover structure main member 52 from the arm insertion mouth 521b formed in the spatial separation wall 52B of the casing cover structure main member 52. Then, the light shielding plate 18 is attached on the spatial separation wall 52B from the opening 52b formed in the upper side of the casing cover structure main body 52 so as to close the arm insertion mouth 521b of the spatial separation wall 52B.

In a second step of the manufacturing process, as shown in FIG. 7A, after the annular lamp connection section 164 connected to the lamp holder 12d, which is inserted from the opening 52b formed in the upper side of the casing cover structure main body 52, is attached to the tip of the arm 163c of the lamp position adjustment mechanism 16 which projects from the spatial separation wall 52B, the discharge lamp 12 is inserted from the opening 52a formed on the left hand side of the casing cover structure main member 52, so that the side tube portion 12b of the discharge lamp 12 to which the mouthpiece 12c is attached is inserted through the openings of the back side light condensing reflection mirror 14 and the front side reflection mirror 15 which are installed on the casing substrate 111 through the reflection mirror support member 13. Since the mouthpiece 12c attached to the side tube portion 12b is held by the lamp holder 12d, the discharge lamp 12 is installed so that the tube axis of the discharge lamp 12 may extend in parallel with the casing substrate 111. In addition, the optical axis of the back side light condensing reflection mirror 14 and the tube axis of the discharge lamp 12 are approximately in agreement with each other.

In a third step of the manufacturing process, as shown in FIG. 7A, after the light emission window structure frame member 53 is attached to the casing cover structure main member 52 so that the opening 52a formed in the left hand side in the figure may be closed, the casing cover lid structure member 54 is attached so that the opening 52b formed in the upper side of the figure may be closed, whereby a light source apparatus 50 is completed.

According to the light source apparatus 50, the lamp position adjustment mechanism 16 is arranged outside the light source section installation space S1 which are partitioned by the casing substrate 111, the wall sections 52D, 52E, and 52H of the casing cover structure main body 52, the spatial separation walls 52A, 52B, and 52C formed integrally with the casing cover structure main body 52, wherein in the light source section installation space S1 the discharge lamp 12, the reflection mirror support member 13, the back side light condensing reflection mirror 14, and the front side reflection mirror 15 are included. In addition, since the lamp position adjustment mechanism 16 is exposed to the outside of the casing 51, while a cooling air introduced from the fresh air inlet 521c of the spatial separation wall 52C at time of lighting of the discharge lamp 12 is hit on the lamp position adjustment mechanism, and then is discharged towards the outside casing 51, the same effect as that of the light source apparatus 10 shown in FIG. 1 can be substantially acquired.

In addition, in the embodiment of the light source apparatus, although examples of the light source apparatus and manufacture method thereof having the discharge lamp in which xenon gas is enclosed as light emission medium in the arc tube portion, is described, they are merely examples. That is, the structure of the light source apparatus and the manufacture method thereof according to the present invention are applicable to other kinds of lamps.

Moreover, the shape of the spatial separation wall structure member is not limited to the box shape and may be any shape.

Moreover, as in the above embodiments, the lamp position adjustment mechanism is arranged outside the light source section installation space partitioned by the spatial separation walls. The other structure of the light source apparatus or steps of the manufacture method of the light source apparatus according to the embodiment can be suitably changed, if needed.

The preceding description has been presented only to illustrate and describe exemplary embodiments of the light source apparatus according to the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A light source apparatus comprising: a casing having a light emission window which is formed on a front side of the casing; a lamp provided in the casing; a light condensing reflection mirror which is provided in the casing, which has a reflection face therein for reflecting visible light emitted from the lamp towards the light emission window, and which transmits ultraviolet light and infrared light;

A support member which supports the light condensing reflecting mirror;

a lamp position adjustment mechanism which holds the lamp and adjusts a position of the lamp in the casing; and a spatial separation wall structure member, which blocks the ultraviolet light and infrared light, and which faces a back side of the light condensing reflection mirror, wherein a space where the lamp and the light condensing reflection mirror, and a space where the lamp position adjustment mechanism is disposed are separated from each other by and the spatial separation wall structure member which faces the back side of the light condensing reflection mirror; and wherein the spatial separation wall structure member has at least one opening for introducing and discharging cooling air.

2. The light source apparatus according to claim 1, wherein the spatial separation wall structure member is a separate component from the casing.

3. The light source apparatus according to claim 2, wherein the spatial separation wall structure member is a box shape.

4. The light source apparatus according to claim 1, wherein the spatial separation wall structure member is part of the casing.

5. The light source apparatus according to claim 1, wherein a fresh air passage mouth is formed in the spatial separation wall structure member.

6. The light source apparatus according to claim 5, wherein the fresh air passage mouth is formed in a side of the spatial separation wall structure member which does not face the light source installation space.

7. The light source apparatus according to claim 1, wherein the lamp position adjustment mechanism is connected through an arm of the lamp position adjustment mechanism to the lamp through an arm insertion mouth formed in the spatial separation wall structure member.

8. The light source apparatus according to claim 7, wherein a width of the arm insertion mouth is larger than a width of the arm.

9. The light source apparatus according to claim 1, wherein the at least one opening of the spatial separation wall structure member is formed on a same plane as that of one side of the casing.

10. A light source apparatus comprising:

a casing having a light emission window which is formed on a front side of the casing;

a lamp provided in the casing;

a light condensing reflection mirror which is provided in the casing and which has a reflection face therein for reflecting light emitted from the lamp towards the light emission window;

a lamp position adjustment mechanism which holds the lamp and adjusts a position of the lamp in the casing;

a spatial separation wall structure; and a light shielding plate having an arm insertion mouth whose width of the arm insertion mouth is larger than a width of an arm of the lamp position adjustment mechanism, in which the light shielding plate is slidably attached to the spatial separation wall structure member, and the arm extends through the arm insertion mouth to the lamp so that the lamp position adjustment mechanism is connected through the arm to the lamp, wherein a light source installation space is defined by the casing and the spatial separation wall structure member, and the lamp position adjustment mechanism is disposed outside the light source installation space.

11. The light source apparatus according to claim 10, wherein a width of the arm insertion mouth is approximately the same as that of the light shielding plate so as to block light emitted from the lamp.

* * * * *